United States Patent [19]

Lukavich

[11] 4,312,145
[45] Jan. 26, 1982

[54] REPLACEABLE FASTENER FOR COVER PLATES AND THE LIKE

[75] Inventor: Paul J. Lukavich, Joliet, Ill.

[73] Assignee: Caterpillar Tractor Co., Peoria, Ill.

[21] Appl. No.: 127,992

[22] PCT Filed: Jan. 9, 1980

[86] PCT No.: PCT/US80/00021

§ 371 Date: Jan. 9, 1980

§ 102(e) Date: Jan. 9, 1980

[87] PCT Pub. No.: WO81/02045

PCT Pub. Date: Jul. 23, 1981

[51] Int. Cl.³ .......................... E02F 5/00; F16B 27/00
[52] U.S. Cl. ........................................ 37/124; 411/83; 411/190; 411/338; 411/368; 411/546
[58] Field of Search ............ 37/124 R, 126 R, 141 R, 37/141 T, 142 R, 129; 296/36, 121, 35 R; 85/1 R, 15, 9 R; 70/231

[56] References Cited

U.S. PATENT DOCUMENTS

| 1,096,070 | 5/1914 | Stull | 85/1 R |
| 2,485,280 | 10/1949 | Grace | 85/1 R |
| 3,357,730 | 12/1967 | Siler | 85/1 R X |
| 3,960,047 | 6/1976 | Liffick | 85/32 R |
| 3,987,830 | 10/1976 | Ladouceur | 151/41.73 |
| 4,043,239 | 8/1977 | Defusco | 85/1 R |
| 4,057,985 | 11/1977 | Stahl | 70/231 |
| 4,102,036 | 7/1978 | Salter | 85/1 R |
| 4,106,808 | 8/1978 | Hyde | 296/35 R |
| 4,117,643 | 10/1978 | Lamothe | 85/1 R X |
| 4,165,904 | 8/1979 | Reppert | 85/1 R |

Primary Examiner—E. H. Eickholt
Attorney, Agent, or Firm—Phillips, Moore, Weissenberger, Lempio & Majestic

[57] ABSTRACT

The push frame (12) of a tractor-scraper (10) normally has a plurality of cover plates (14) relasably secured therebelow to provide access internally of the push frame. In standard practice, the cover plates are secured to the push frame by a plurality of bolts and the heads of the bolts are subjected to wear and possible breaking-off due to their exposure upon operation of the tractor-scraper. This invention provides a mounting assembly (13) for expeditiously removing and replacing the cover plates upon wearing or breaking-off of the heads (19) of bolts (18) thereof by providing an internally and externally threaded bushing (24) which is threadably connected on the push frame and is further threadably connected to each bolt. Thus, a workman need only engage the bushing with a socket wrench or the like to release the bolt and thus the cover plate upon wearing or breaking-off of the heads of the bolts.

3 Claims, 3 Drawing Figures

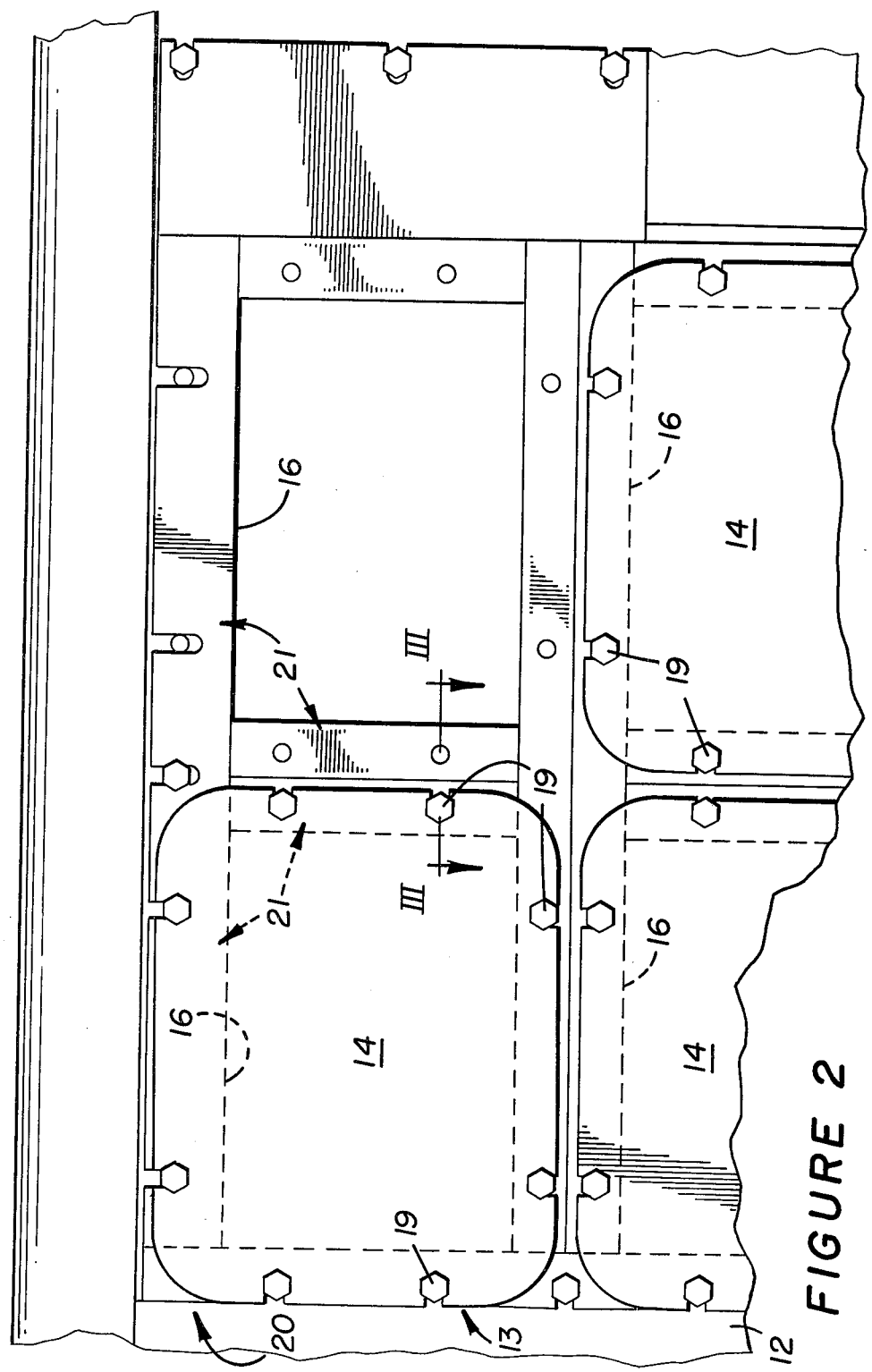

REPLACEABLE FASTENER FOR COVER PLATES AND THE LIKE

DESCRIPTION

1. Technical Field

This invention relates to a replaceable fastener adapted to secure a member in place, such as a cover plate secured beneath a push frame of a tractor-scraper.

2. Background Art

The securance of cover plates and the like externally on structural members of a construction vehicle, for example, is normally accomplished by the use of bolts. The heads of the bolts are thus exposed to subject them to shearing-off or wear, whereby removal of the bolts proves difficult and time-consuming. In particular, the shanks of the bolts must be removed by use of special tooling to facilitate removal of the cover plate and replacement of the bolts.

DISCLOSURE OF INVENTION

The present invention is directed to overcoming one or more of the problems as set forth above.

In one aspect of this invention, a mounting assembly comprises a first member, a second member, and fastening means for releasably securing the first and second members together. The fastening means includes an internally and externally threaded bushing threadably connected externally to the first member and a bolt extending through the second member and threadably connected internally of the bushing.

The bushing includes a head engaging an outer side of the first member and the bolt includes a head disposed on an outer side of the second member.

The improvement in this mounting assembly is that the first member includes a grid frame composed of a plurality of grid members and a cylindrical bushing secured in a grid member with the internally and externally threaded bushing being threadably connected externally to the cylindrical bushing.

Thus, should the head of the bolt become worn or broken-off, the bolt may be replaced by simply threadably disengaging the bushing from the first member. This novel arrangement thus facilitates the expeditious removal of the second member from the first member. For example, the second member could comprise a cover plate releasably secured beneath a scraper push frame.

BRIEF DESCRIPTION OF THE DRAWINGS

Other objects and advantages of this invention will become apparent from the following description and accompanying drawings wherein:

FIG. 2 is an enlarged bottom plan view of the mounting assembly, taken in the direction of arrows II—II in FIG. 1.

BEST MODE OF CARRYING OUT THE INVENTION

Figure 1:
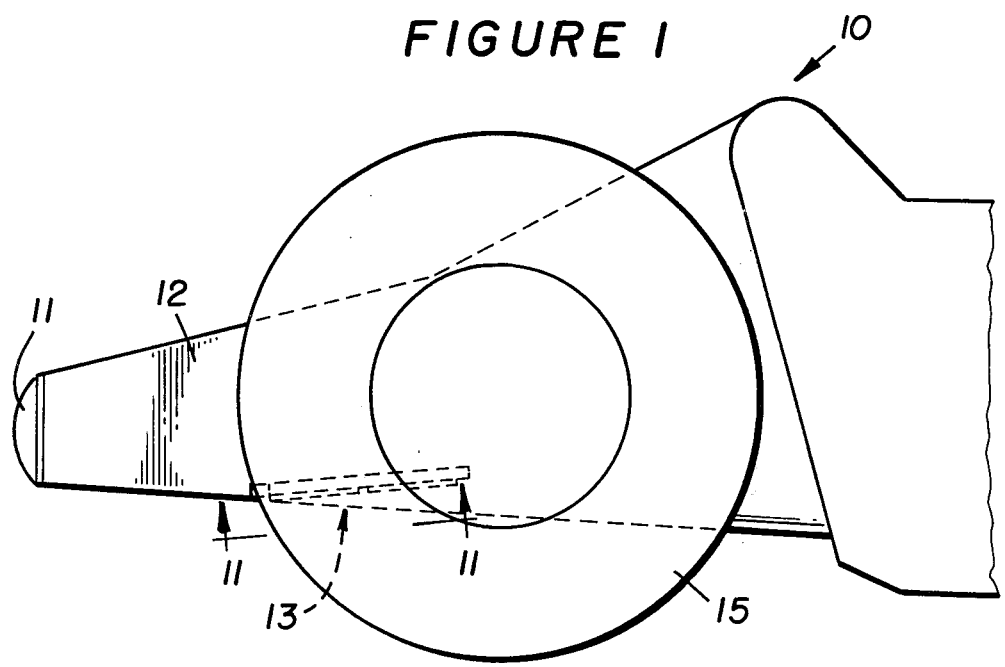
FIG. 1 is a partial side elevational view of a tractor-scraper having a mounting assembly embodiment of the present invention mounted thereon.

FIG. 1 partially illustrates a tractor-scraper 10, including a push block 11 secured rearwardly on a push frame 12. The push block is adapted to be engaged by a bulldozer or the like to increase the tractive capabilities and scraping-force of the tractor-scraper. A mounting assembly 13, including a plurality of cover plates 14 (FIG. 2), provides access internally of push frame 12 upon removal of the cover plates. For example, a workman may require access to the brake assemblies (not shown) operatively associated with roadwheels 15 of the scraper portion of the tractor-scraper.

Figure 3:
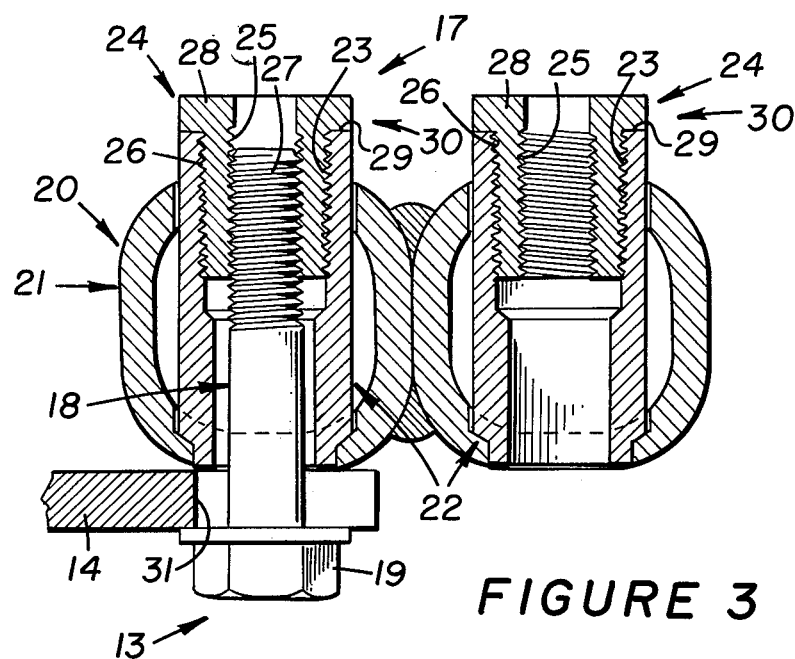
FIG. 3 is an enlarged sectional view through the mounting assembly, taken in the direction of arrows III—III in FIG. 2.

Referring to FIGS. 2 and 3, each cover plate 14 is removably mounted beneath push frame 12 to normally cover an access hole 16 defined in the push frame. When cover plates of this type are releasably secured to the push frame by standard bolts, the heads of the bolts are exposed to thus subject them to wear and possibly shearing-off whereby extensive time and effort is required to remove the shanks of the bolts. For example, one procedure for removing the worn bolts would be to tap a hole therein and threadably engage a removal tool within the tap hole in a conventional manner.

Reeferring to FIG. 3, mounting assembly 13 avoids the above problem by providing a plurality of fastening means 17 each including a bolt 18 adapted to be expeditiously removed to thus remove cover plate 14 upon wearing or breaking-off of a head 19 of the bolt. Each fastening means 17 releasably secures cover plate 14 to a grid frame 20 composed of a plurality of grid members 21. Grid frame 20 is welded or otherwise suitably secured to push frame 12 to form an integral part thereof and defines a plurality of rectangular access openings 16 therethrough, each normally covered by a cover plate 14.

A cylindrical bushing 22 is suitably secured within grid member 21 to form an integral part thereof and has screw threads 23 formed internally on one end thereof. Fastening means 17 further comprises a bushing 24 which has internal and external threads 25 and 26 formed thereon. External threads 26 threadably engage threads 23 of bushing 22 whereas internal threads 25 threadably receive a threaded shank 27 of bolt 18. An annular flange 28 is formed on an end of bushing 24 to abut an end 29 of bushing 22 to provide stop means 30 precisely locating bushing 24 within bushing 22.

Internally and externally threaded bushing 24 of fastening means 17 is thus threadably connected externally at threads 23 and 26 to grid member 21 whereas bolt 18 extends through an opening or slot 31, defined through cover plate 14, and is threadably connected internally of bushing 24 at interengaging threads 25 and 27. Flange 28 of bushing 24 may be formed as a hex head, if so desired, to accommodate reception of a standard socket thereon for releasably securing the bushing in place. It can thus be seen that fastening means 17 may be released by either rotating bolt 18 or bushing 24.

INDUSTRIAL APPLICABILITY

Mounting assembly 13 of this invention finds particular application to construction vehicles, such as tractor-scrapers, wherein cover plates and the like are releasably secured to structural members of the vehicle. For example, as shown in FIG. 1 a push frame 12 of tractor-scraper 10 has a plurality of cover plates 14 releasably secured thereunder by fastening means 17. During operation of the tractor-scraper, bolt heads 19 are exposed to thus subject them to wear and possible breaking-off whereby they may require replacement.

Referring to FIG. 3, assuming that bolt head 19 has been unduly worn or broken-off, a workman need only engage and rotate head 28 of bushing 24 to release the bushing from bolt 18 and bushing 22. Bolt 18 will thus be released and may be replaced by a new one expeditiously. It should be understood that suitable access openings (not shown) are provided for facilitating engagement of head 28 of bushing 24 with a socket wrench by a workman.

Other aspects, objects, and advantages of this invention can be obtained from a study of the drawing, the disclosure and the appended claims. For purposes of claim terminology herein, the term "first member" may be construed to include grid member 21 and bushing 22 which is integrally secured thereto whereas the term "second member" includes cover 14.

I claim:

1. In a mounting assembly (13) having a first member (21,22), a second member (14) mounted on said first member (21,22), and fastening means (17) for releasably securing said second member (14) to said first member (21,22), said fastening means (17) including an internally and externally threaded bushing (24) threadably connected externally to said first member (21,22), and a bolt (18) extending through said second member (14) and threadably connected internally of said bushing (24), said bushing (24) including a head (28) thereon engaging an outer side of said first member (21,22) at a location remote from said second member (14) and said bolt (18) including a head (19) disposed on an outer side of said second member (14) at a location remote from said first member (21,22), the improvement comprising:

said first member (21,22) including a grid frame (20) composed of a plurality of grid members (21) and a cylindrical bushing (22) secured in one of said grid members (21) and wherein said internally and externally threaded bushing (24) is threadably connected externally to said cylindrical bushing (22).

2. The mounting assembly of claim 1 wherein said grid frame (20) defines an access opening (16) therethrough and wherein said second member (14) includes a cover plate (14) overlying said access opening (16) and secured to said grid frame (20) by a plurality of said fastening means (17).

3. The mounting assembly of claim 2 further including a push frame (12) of a tractorscraper (10) and wherein said grid frame (20) is secured beneath said push frame (12).

* * * * *